(12) United States Patent
Mehta

(10) Patent No.: US 12,079,631 B2
(45) Date of Patent: *Sep. 3, 2024

(54) METHOD AND SYSTEM FOR HARDWARE-ASSISTED PRE-EXECUTION

(71) Applicant: Hewlett Packard Enterprise Development LP, Spring, TX (US)

(72) Inventor: Sanyam Mehta, Bloomington, MN (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/328,099

(22) Filed: Jun. 2, 2023

(65) Prior Publication Data

US 2023/0315471 A1 Oct. 5, 2023

Related U.S. Application Data

(63) Continuation of application No. 17/412,200, filed on Aug. 25, 2021, now Pat. No. 11,687,344.

(51) Int. Cl.
*G06F 9/30* (2018.01)
*G06F 9/32* (2018.01)
(Continued)

(52) U.S. Cl.
CPC ........ *G06F 9/3814* (2013.01); *G06F 9/30047* (2013.01); *G06F 9/30065* (2013.01);
(Continued)

(58) Field of Classification Search
CPC ............... G06F 9/3814; G06F 9/30047; G06F 9/30065; G06F 9/321; G06F 9/38; G06F 9/3802; G06F 9/5016
See application file for complete search history.

(56) References Cited

U.S. PATENT DOCUMENTS 6,959,435 B2 10/2005 Ju et al.
7,478,198 B2 1/2009 Latorre et al.
(Continued)

OTHER PUBLICATIONS

"Standard Performance Evaluation Corporation", The spec cpu 2006 benchmark suite. [Online]. Available: https://www.spec.org/cpu2006/, retrieve date Apr. 26, 2022, pp. 3.
(Continued)

*Primary Examiner* — Corey S Faherty
(74) *Attorney, Agent, or Firm* — Slater Matsil, LLP

(57) ABSTRACT

One aspect provides a system for hardware-assisted pre-execution. During operation, the system determines a pre-execution code region comprising one or more instructions. The system increments a global counter upon initiating the one or more instructions. The system issues a first instruction, which involves setting, in a first entry for the first instruction in a data structure, a first prefetch region identifier with a current value of the global counter. Responsive to a head pointer of the data structure reaching the first entry, the system: determines, based on a non-zero value for the first prefetch region identifier, that the first entry is not available to be allocated; and advances the head pointer to a next entry in the data structure, which renders a load associated with the first entry as a non-blocking load. The system resets the global counter upon completing the one or more instructions.

20 Claims, 8 Drawing Sheets

(51) Int. Cl.
*G06F 9/38* (2018.01)
*G06F 9/50* (2006.01)

(52) U.S. Cl.
CPC .............. *G06F 9/321* (2013.01); *G06F 9/38* (2013.01); *G06F 9/3802* (2013.01); *G06F 9/5016* (2013.01)

(56) References Cited

U.S. PATENT DOCUMENTS

| | | |
|---|---|---|
| 7,711,932 B2 | 5/2010 | Akkary et al. |
| 8,880,854 B2 | 11/2014 | Hooker et al. |
| 9,262,170 B2 | 2/2016 | Krishna et al. |
| 9,274,795 B2 | 3/2016 | Henry et al. |
| 9,311,084 B2 | 4/2016 | Sundar et al. |
| 2004/0128489 A1 | 7/2004 | Wang et al. |
| 2005/0120191 A1 | 6/2005 | Akkary et al. |
| 2007/0074006 A1 | 3/2007 | Martinez et al. |
| 2009/0327661 A1 | 12/2009 | Sperber et al. |
| 2012/0278596 A1 | 11/2012 | Tran |
| 2014/0040595 A1 | 2/2014 | Tran |
| 2014/0380023 A1 | 12/2014 | Smaus et al. |
| 2015/0268959 A1 | 9/2015 | Krishna et al. |
| 2017/0344374 A1 | 11/2017 | Friedmann et al. |
| 2019/0087192 A1 | 3/2019 | Priyadarshi et al. |
| 2020/0004541 A1 | 1/2020 | Sankaranarayanan et al. |

OTHER PUBLICATIONS

"Software-based speculative precomputation (ia-32)," in Intel Compiler (v9.0). [Online]. Available: http://astroa.physics.metu.edu/MANUALS/intel_icc/mergedProjects/optaps_cls/common/optaps_pgo_sspopt.htm, retrieved on Apr. 26, 2022, pp. 3.
"The graph500 benchmark," 2020. [Online]. Available: http://www.graph500.org/ Retrieve date Apr. 26, 2022, pp. 5.
Ainsworth, S., et al., "An event-triggered programmable prefetcher for irregular workloads," Twenty-Third International Conference on Architectural Support for Programming Languages and Operating Systems, Mar. 19, 2018, p. 578-592.
Ainsworth, S., et al., "Software prefetching for indirect memory accesses," Proceedings of the 2017 International Symposium on Code Generation and Optimization, ser. CGO '17. IEEE, Feb. 4, 2017, pp. 305-317.
Balkesen, C., et al., "Main-memory hash joins on multi-core cpus: Tuning to the underlying hardware," 2013 IEEE 29th International Conference on Data Engineering, Jun. 25, 2013, pp. 362-373.
Callahan, D., et al., "Software prefetching," Proceedings of the Fourth International Conference on Architectural Support for Programming Languages and Operating Systems, Apr. 1, 1991, pp. 40-52.
Chen, T. F., et al., "Effective hardware-based data prefetching for high-performance processors," IEEE Transactions on Computers, vol. 44, No. 5, May 1995, pp. 609-623.
Chen, T.- F., et al., "Reducing memory latency via non-blocking and prefetching caches," Proceedings of the Fifth International Conference on Architectural Support for Programming Languages and Operating Systems, Sep. 1, 1992, pp. 51-61.
Collins et al.; Speculative Precomputation: Long-range Prefetching of Delinquent Loads; 2001; IEEE (Year: 2001).
Collins, J. D., et al., "Speculative precomputation: long-range prefetching of delinquent loads," in Proceedings 28th Annual International Symposium on Computer Architecture, Jul. 4, 2001, pp. 14-25.
Cooksey, R. et al., "A stateless, content-directed data prefetching mechanism," ACM SIGOPS Operating Systems, vol. 36, Issue 5, Oct. 1, 2002, pp. 279-290.
Ham, T. J. et al., "Desc: Decoupled supplycompute communication management for heterogeneous architectures," 2015 48th Annual IEEE/ACM International Symposium on Microarchitecture (MICRO), Dec. 9, 2015, pp. 191-203.
Hennessy, J. L. et al., "Computer Architecture, Fifth Edition: A Quantitative Approach", Morgan Kaufmann Publishers Inc., Sep. 2011, pp. 880.
Ishii, Y., et al., "Access map pattern matching for data cache prefetch," Proceedings of the 23rd International Conference on Supercomputing, Jun. 8, 2009, p. 499-500. [Online]. Available: https://doi.org/10.1145/1542275.1542349.
Jain, A., et al., "Linearizing irregular memory accesses for improved correlated prefetching," 2013 46th Annual IEEE/ACM International Symposium on Microarchitecture (MICRO), Dec. 11, 2013, p. 247-259.
Jaleel, A., "Memory characterization of workloads using instrumentation driven simulation—a pin-based memory characterization of the spec cpu2000 and spec cpu2006 benchmark suites," VSSAD Technical Report, 2007, pp. 1-12.
Jimborean, A., et al., "Fix the code. don't tweak the hardware: A new compiler approach to voltage-frequency scaling," in Proceedings of Annual IEEE/ACM International Symposium on Code Generation and Optimization, Feb. 2014, pp. 262-272.
Joseph, D., et al., "Prefetching using markov predictors," IEEE Transactions on Computers, vol. 48, Issue 02, Feb. 1999, pp. 121-133.
Kim et al.; Warped-Preexecution: A GPU Pre-execution Approach for Improving Latency Hiding; 2016; IEEE (Year: 2016).
Kim, D., et al. "Design and evaluation of compiler algorithms for pre-execution," ACM SIGOPS Operating Systems Review, vol. 36, Issue 5, Dec. 2002, pp. 159-170.
Koukos, K., et al., "Towards more efficient execution: A decoupled access-execute approach," Proceedings of the 27th International ACM Conference on International Conference on Supercomputing, Jun. 2013, pp. 253-262.
Kuukos, K., et al., "Multiversioned decoupled access-execute: The key to energy-efficient compilation of general-purpose programs," Proceedings of the 25th International Conference on Compiler Construction, Mar. 2016, pp. 121-131.
Lau, E., et al., "Multicore performance optimization using partner cores," in Proceedings of the 3rd USENIX Conference on Hot Topic in Parallelism, ser. HotPar'11. USA: USENIX Association, 2011, pp. 7.
Lipasti, M. H., et al., "Spaid:software prefetching in pointer- and call-intensive environments," Proceedings of the 28th Annual International Symposium on Microarchitecture, Dec. 1, 1995, pp. 231-236.
Luk, C. K., et al., "Compiler-based prefetching for recursive data structures," Proceedings of the Seventh International Conference on Architectural Support for Programming Languages and Operating Systems, Oct. 1996, pp. 222-233.
Lumsdaine, A., et al. "Challenges in parallel graph processing," Parallel Processing Letters, vol. 17, No. 01, Mar. 1, 2007, pp. 5-20.
Mccalpin, J.D., "Memory bandwidth and machine balance in current high performance computers," IEEE Computer Society Technical Committee on Computer Architecture (TCCA) Newsletter, Sep. 19, 1995, pp. 1-7.
Michaud, P., "Best-offset hardware prefetching," 2016 IEEE International Symposium on High Performance Computer Architecture (HPCA), Apr. 4, 2016, pp. 469-480.
Mowry, T. C., et al., "Design and evaluation of a compiler algorithm for prefetching," Proceedings of the Fifth International Conference on Architectural Support for Programming Languages and Operating Systems, vol. 27, No. 9, Sep. 1, 1992, pp. 62-73.
Mowry, T. C., "Tolerating latency through software-controlled data prefetching," PhD Thesis, Jun. 01, 1994.
Mutiu, O. et al., "Runahead execution: An alternative to very large instruction windows for out-of-order processors," The 9th International Symposium on High-Performance Computer Architecture, , Feb. 12, 2003, pp. 12.
Naithani et al.; Precise Runahead Execution; 2019; IEEE (Year: 2019).
Naithani. A., et al., "Precise runahead execution," 2020 IEEE International Symposium on High Performance Computer Architecture (HPCA), Apr. 16, 2020, pp. 397-410.

(56) References Cited

OTHER PUBLICATIONS

Nesbit, K. J. et al., "Data cache prefetching using a global history buffer," 10th International Symposium on High Performance Computer Architecture (HPCA'04), Feb. 18, 2004, pp. 10.

Ordaz et al.; A Reorder Buffer Design for High Performance Processors; 2012 (Year: 2012).

Pugsley, S. H., et al., "Sandbox prefetching: Safe run-time evaluation of aggressive prefetchers," 2014 IEEE 20th International Symposium on High Performance Computer Architecture (HPCA), Feb. 19, 2014, pp. 12.

Roth. A., et al., "Speculative data-driven multithreading," Proceedings HPCA Seventh International Symposium on High-Performance Computer Architecture, 2001, pp. 37-48.

Tramm, J. R. et al., "XSBench—the development and verification of a performance abstraction for Monte Carlo reactor analysis," in PHYSOR 2014—The Role of Reactor Physics toward a Sustainable Future, Sep. 2014, pp. 13.

Vishwanathan, K., "Disclosure of hardware prefetcher control on some intel® processors." [Online]. Available: https://software.intel.com/content/www/us/en/develop/articles/disclosure-of-hw-prefetcher-control-on-some-intel-processors.html.

Wikichip, "The sunny cove microarchitecture," 2020. https://en.wikichip.org/wiki/intel/microarchitectures/sunny_cove, Retrived on May 2, 2022, pp. 14.

Wu, Y., et al., "Value-profile guided stride prefetching for irregular code," Compiler Construction, 11th International Conference, Apr. 8, 2002, pp. 307-324.

Yu, X., et al., "Imp: Indirect memory prefetcher," in 2015 48th Annual IEEE/ACM International Symposium on Microarchitecture (MICRO), Dec. 9, 2015, pp. 178-190.

Zilles, C., et al., "Execution-based prediction using speculative slices," Proceedings of the 28th Annual International Symposium on Computer Architecture, Jul. 4, 2001, pp. 2-13.

LINES 130

```
110.1   /* Original /Main loop */
110.2   for ( ; arc < stop_arcs; arc += nr_group ) {
110.3     if( arc->ident > BASIC ) {
110.4       red_cost = arc->cost – arc->tail->potential + arc->head->potential;
110.5       if( bea_is_dual_infeasible( arc, red_cost ) ) {
110.6         ...
110.7       }
110.8     }
110.9   }
```

FIG. 1A

```
130.1   for ( ; arc < stop_arcs; arc += nr_group*f ) { //strip-mined by factor f
130.2     /* Pre-execution loop */
130.3     for( arc1=arc; arc1 < min(arc+nr_group*f, stop_arcs); arc1 += nr_group ) {
130.4       if( arc->ident > BASIC ) {
130.5         #pragma prefetch arc1->cost
130.6         #pragma prefetch arc1->tail->potential
130.7         #pragma prefetch arc1->head->potential
130.8       }
130.9     }
130.10    /* Original /Main (sub-)loop*/
130.11    for ( arc1 = arc; arc1 < min(arc+nr_group*f, stop_arcs); arc1 += nr_group ) {
130.12      if( arc->ident > BASIC ) {
130.13        red_cost = arc1->cost – arc1->tail->potential + arc1->head->potential;
130.14        if( bea_is_dual_infeasible( arc1, red_cost ) ) {
130.15          ...
130.16        }
130.17      }
130.18    }
130.19  }
```

FIG. 1B

```
150.1   .L36
150.2       ldr    w3, [x2, 24]                // Line 130.4
150.3       prfm   PLDL1KEEP, [x2]             // Line 130.5
150.4       cmp    w3, 0                       // Line 130.4
150.5       ble    .L35                        // Line 130.4
150.6       ldp    x6, x3, [x2, 8]             // Lines 130.6-.7
150.7       prfm   PLDL1KEEP, [x6]             // Line 130.6
150.8       prfm   PLDL1KEEP, [x3]             // Line 130.7
150.9   .L35
150.10      add    x2, x2, x5                  // Line 130.3
150.11      cmp    x4, x2                      // Line 130.3
150.12      bhi    .L36                        // Line 130.3
```

FIG. 1C

| CONFIGURATION 212 | CLOCKS (M) 214 | ROB STALLS (%) 216 | MSHR STALLS (%) 218 | LQ STALLS (%) 220 | RS STALLS (%) 222 | HWP REQ (M) 224 | MEM REQ (M) 226 |
|---|---|---|---|---|---|---|---|
| NO HARDWARE PREFETCHING | 347.6 | 88.2 | 3.2 | 0 | 0 | 0 | 17.8 |
| HARDWARE PREFETCHING | 299.5 | 85.9 | 1.4 | 0 | 0 | 9.7 | 18.2 |
| PRE-EXECUTION / SOFTWARE PREFETCHING | 242.7 | 13 | 2.9 | 62.7 | 0 | 9.9 | 18.2 |
| HARDWARE-ASSISTED PRE-EXECUTION (HA-PRE) | 181.3 | 25.4 | 14.4 | 39.6 | 0 | 9.9 | 18.2 |

FIG. 2

| INSTRUCTION TYPE 312 | DESTINATION FIELD 314 | VALUE FIELD 316 | READY FIELD 318 | INSTRUCTION STATE 320 | PRE-FETCH REGION ID 322 |
|---|---|---|---|---|---|
| <ALU> | <REG_A> | <VALUE_A> | <FREE> | <COMMIT> | <PRID_330.1 = 0> |
| ... | ... | ... | ... | ... | ... |
| <BRANCH> | <REG_B> | <VALUE_B> | <NOT FREE> | <ISSUE> | <PRID_332.1 = 0> |
| ... | ... | ... | ... | ... | ... |
| <LOAD/STORE> | n/a | <VALUE_C> | <NOT FREE> | <COMMIT> | <PRID_334.1 = 1> |
| <LOAD/STORE> | n/a | <VALUE_D> | <NOT FREE> | <ISSUE> | <PRID_336.1 = 1> |
| <LOAD/STORE> | n/a | <VALUE_E> | <NOT FREE> | <ISSUE> | <PRID_338.1 = 1> |

Rows labeled: 330, 332, 334, 336, 338. Table 300.

FIG. 3

METHOD AND SYSTEM FOR HARDWARE-ASSISTED PRE-EXECUTION

CROSS-REFERENCE TO RELATED APPLICATIONS

This application is a continuation application of and claims priority to application Ser. No. 17/412,200, filed on Aug. 25, 2021, the contents of which are hereby incorporated by reference in their entireties.

BACKGROUND

Field

This disclosure is generally related to the field of computer organization. More specifically, this disclosure is related to a method and system for hardware-assisted pre-execution.

BRIEF DESCRIPTION OF THE FIGURES

FIG. 1A illustrates a code excerpt with a main loop, in accordance with an aspect of the present application.

FIG. 1B illustrates a code excerpt with a pre-execution loop preceding the main loop of FIG. 1A, in accordance with an aspect of the present application.

FIG. 1C illustrates assembly language instructions corresponding to the code excerpt of FIG. 1B.

FIG. 2 illustrates a table with a performance comparison across four different configurations, in accordance with an aspect of the present application.

FIG. 3 illustrates a reorder buffer (ROB) data structure, in accordance with an aspect of the present application.

In the figures, like reference numerals refer to the same figure elements.

DETAILED DESCRIPTION

Figure 4A:
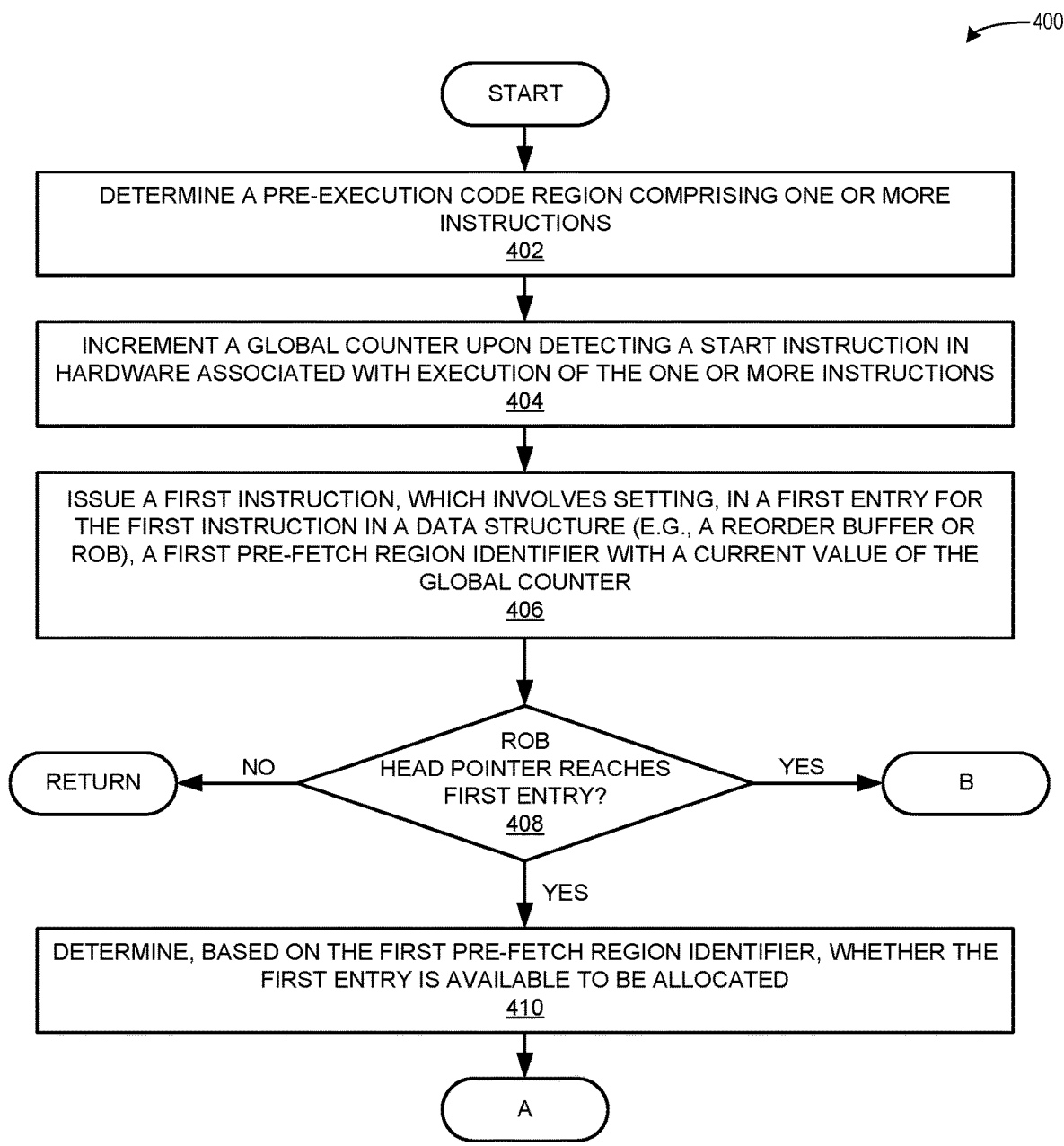
FIG. 4A presents a flowchart illustrating a method which facilitates hardware-assisted pre-execution, in accordance with an aspect of the present application.

The following description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

Ongoing advances continue to improve the compute performance in modern processors through the use of more cores, faster clocks, longer vectors (or graphics processing units) and increased Out-of-Order (OoO) execution capability. However, limitations due to memory persist. While some advances have been made in improving memory bandwidth through, e.g., High-Bandwidth Memory (HBM) and/or higher clocked Double Data Rate 5 (DDR5) memory, issues relating to long memory latency continue to persist. In some solutions, the OoO execution data structures (e.g., the reorder buffer (ROB), the load/store queue, and reservation stations) have increased in size to better tolerate latency. However, this is generally offset by the increase in processor frequency and wider instruction issue. As a result of this insufficient OoO capability coupled with more complex (and bigger) workloads whose working sets increasingly evade the caches, memory latency continues to be a major hurdle to performance improvement.

Some current techniques can be used to address the memory latency, but these techniques may result in some limitations. In a first technique, faster caches may help when the application work set is small enough to fit one of the multiple caches, but may be limited as the application work set increases in size. A second technique is hardware prefetching, in which the hardware can detect data streams/strides/patterns in the application and requests data from memory before use. However, hardware prefetching alone may be ineffective when the application involves irregular memory accesses (e.g., in graph/tree/list processing or random/hashed accesses) unless complemented by software.

A third technique is pre-execution, in which an unused (helper) thread in the core with Simultaneous Multithreading (SMT) capability can execute a slice of the program/routine. Through effective synchronization and coordination, the helper thread may not lead or lag too much and can warm up the cache for the main thread. In the program slice, only the critical operations that lead up to the memory accesses are retained, and the terminal memory accesses are converted to non-blocking prefetch operations. However, in scenarios with irregular accesses, the chain of instructions that lead up to the address of irregular accesses may involve other blocking (and delinquent) loads, which can cause significant processor stalls just as without pre-execution. Furthermore, pre-execution can lead to conflicts between helper and main threads for the already limited OoO execution structures, e.g., ROB, load/store queue, reservation stations, and miss status holding registers (MSHRs).

A fourth technique is software prefetching, in which prefetch requests are inserted by the user/compiler in the source code. Software prefetching can be similar to the pre-execution technique, except that the user/compiler does not need to create a slice and run it on another thread. This may be useful in architectures which do not feature SMT. Similar to pre-execution, software prefetching can also be ineffective with delinquent loads, which can result in long stalls. In addition, software prefetching can result in a disadvantage over pre-execution: it may sometimes not be possible to prefetch ahead (as in the case of linked lists) or may require insertion of additional conditional checks (as in the case of other irregular applications as indirect memory accesses).

Thus, despite these current techniques, challenges remain in providing an effective solution to address memory latency, especially for irregular memory accesses, where address computation often involves loads that cannot be converted to non-blocking prefetches. These delinquent loads can lead to processor back-end stalls by filling up four important data structures: the ROB, which buffers all operations from issue until they commit results; the load/store queue, which buffers all loads from issue until they commit and are retired from the ROB; reservation stations, which buffer all non-load/store operations from issue until they finish execution; and MSHRs, which track all outstanding memory requests at caches. Examples of applications with significant delinquent loads can include graph algorithms, speech recognition, numerical analysis, database manipulation, and page ranking.

The aspects described herein address these challenges (i.e., stalls due to delinquent loads) by providing hardware-assisted pre-execution (HA-PRE), which can be used in both memory-bound applications and by the user/compiler. HA-PRE does not rely on an SMT thread to run the pre-execution slice. Instead, the slice can be part of the main program that runs on a single thread, and execution of the pre-execution slice can be interspersed with the original program. In HA-PRE, the system can determine a pre-execution code region comprising one or more instructions. The pre-execution code region can be a loop or an iteration. The system can execute the pre-execution slice (e.g., the instructions in the pre-execution code region) using a strip-mining (or loop-sectioning) transformation apart from creating a copy of the loop ("copy loop"). This copy loop, which is inserted before the original loop, can be referred to as the "pre-execution loop," as described below in relation to FIGS. 1A-1C. This pre-execution loop can result in certain beneficial features and behavior:

Instructions in the pre-execution loop can be rendered non-blocking. The purpose of the pre-execution loop is only to warm up the cache. No architectural state (e.g., register file or memory) needs to be updated. Thus, whenever a given instruction within the pre-execution loop reaches the head of the ROB, that given instruction can be "pseudo-committed." In this disclosure, the term "pseudo-committed" refers to advancing the head of the ROB forward to commit the following instructions regardless of whether or not the given instruction has finished execution. Using this property, HA-PRE can render all instructions within the pre-execution loop as non-blocking. However, these instructions may need to propagate their results to other instructions waiting to receive their operands, and therefore do not free the respective ROB entry yet for use by newly allocating instructions. That is, when the ROB head pointer reaches an entry which is marked as part of a pre-execution loop, in order to allocate a new entry, the ROB head pointer need not wait for the marked entry to complete before advancing to a next entry. When an instruction finishes execution, and all dependent instructions (which are ensured to be within the same slice or, for a loop, within the current or the immediate next iteration) have received their operand (i.e. issued), the system can free the ROB entry, and a new instruction may subsequently claim that freed ROB entry. As a result, no single instruction can impede continuous instruction issue. A detailed example, including the benefits of reduced ROB stalls, is provided below in relation to FIGS. 1A-C.

Reducing pressure on the load queue. In an aggressively out-of-order processor, a regular load may be buffered in the load queue until it retires from the ROB, since it may have bypassed a conflicting store to the same address (in which case it must be replayed). However, a pre-execution slice does not contain stores to memory. Thus, the loads in the slice can free up their respective load queue entry upon finishing execution (and forwarding its result). As a result, the pressure on the load queue may be reduced. The software prefetches can be similarly evicted from the load queue upon finishing execution.

Prefetch to L2 cache instead of L1 cache. The memory-level parallelism (MLP) of an application with irregular accesses can be limited by the number of allowed outstanding memory requests (e.g., in the MSHRs) at the L1 cache. Terminal loads in the pre-execution slice can be converted to prefetches and there may be many more MSHRs at the L2 cache than at the L1 cache. Thus, the system can prefetch to the L2 cache instead of the L1 cache. This can result in both improving the MLP of the application and alleviating a potential bottleneck. Although the main loop can access the L2 cache instead of the L1 cache, the absence of delinquent loads makes it easy to hide the latency associated with the L2 cache.

Reducing stalls due to filled up reservation stations. All non-memory operations that are buffered in the reservation stations can free up their respective entries upon instruction completion, as in a conventional implementation. However, since the above changes increase the effective MLP, the time spent by non-memory operations waiting to receive their operands can be much reduced, which can result in reducing the stalls due to filled-up reservation stations.

Example Code Excerpts

FIG. 1A illustrates a code excerpt 100 with a main loop, in accordance with an aspect of the present application. Code excerpt 100 belongs to an mcf benchmark (which solves a combinatorial optimization problem) from the Standard Performance Evaluation Corporation (SPEC) suite that contains the single most time-consuming loop within the subroutine primal_bea_mpp. Code excerpt 100 depicts an original main loop with lines 110 (including lines 110.1-110.9).

FIG. 1B illustrates a code excerpt 120 with a pre-execution loop preceding the main loop of FIG. 1A, in accordance with an aspect of the present application. Code excerpt 120 depicts: the original main loop of FIG. 1, strip-mined by a factor of f (as indicated at lines 130.1, 130.3, and 130.11); a pre-execution loop (lines 130.3-130.8); and the original (sub-) loop (lines 130.11-130.18). The pre-execution loop precedes the original (sub-)loop that is set to execute on the same thread, unlike in a traditional pre-execution. The system can perform the strip-mining in a manner which replicates the synchronization (across SMT threads) in traditional pre-execution to ensure that the main loop finds the data in the cache, i.e., it is neither too late nor too early. This strip-mining optimization can eliminate the overhead of thread creation and synchronization, especially because the trip count of the given loop in mcf is not large but can be invoked many times. With these advantages over traditional pre-execution, combined with a partial overlap between the pre-execution loop and the main loop achieved with the help of a small (only enough to hide memory latency) strip-mine factor, the described aspects use this approach, which is referred to in this disclosure as "pre-execution."

The approach of the described aspects can be used in non-SMT contexts. The described aspects can also avoid the modeling of synchronization overhead in an SMT environment, which is dependent on many factors and can be difficult to accurately model, especially for short inner loops as in many benchmarks. The pre-execution loop of FIG. 1B (lines 130.3-130.8) only contains code needed to generate addresses for memory references (e.g.: arc1→cost; arc1→tail→potential; and arc1→head→potential). These memory accesses are irregular because they involve two levels of indirection (i.e., first retrieve arc1, then retrieve the described detailed features). These memory accesses can also be referred to as terminal memory accesses, because they are converted to non-blocking prefetch instructions, as depicted by the compiler pragmas in FIG. 1B (lines 130.5-130.7). Furthermore, as discussed above, the system prefetches to the L2 cache to avoid stalling due to limited L1 MSHRs.

Moreover, traditional software prefetching (where the prefetch requests are inserted within the main loop) may not be ideal in this example because traditional software prefetching begins prefetching a few iterations (also known as the "prefetch distance") ahead, which can result in missing critical references in a short loop (as shown in FIG. 1B), and can also involve additional overhead of conditional code in order to test when to stop prefetching. Thus, FIG. 1B depicts an improved and efficient form of software prefetching.

FIG. 1C illustrates assembly language instructions 140 corresponding to the code excerpt of FIG. 1B. Instructions 140 can include lines 150, e.g., lines 150.1-150.12, which can each correspond to one or more instructions from the code excerpt of FIG. 1B (as indicated by the // Line 130.xx indicator at the end of each of lines 150). The instructions in the ".L36" section (e.g., at lines 150.2-150.8) can depict operations which are depend on delinquent loads, while the instructions in the ".L35" section (e.g., at lines 150.10-150.12) can depict operations which are not dependent on delinquent loads.

Comparison of Performance for Four Different Hardware Configurations, Including Improvements by the Described Aspects FIG. 2 illustrates a table 200 with a performance comparison across four different configurations, for the loop from mcf depicted in FIGS. 1A and 1B, in accordance with an aspect of the present application. The four configurations include: baseline, using the original code in FIG. 1, without hardware prefetching (a row/entry 232: "no hardware prefetching"); the baseline with hardware prefetching (a row/entry 234: "hardware prefetching"); pre-execution, using the code in FIG. 1B, but with no additional hardware support (a row/entry 236: "pre-execution/software prefetching); and the system of the described aspects, hardware assisted pre-execution (a row/entry 238: "hardware-assisted pre-execution (HA-PRE)"). Rows or entries in table 200 can include the following columns: a configuration 212, corresponding to one of the four above-described configurations; a clocks (M) 214, which indicates processor clock time; ROB stalls (%) 216, which indicate the percentage of stalls associated with the ROB data structure; MSHR stalls (%) 218, which indicate the percentage of stalls associated with the MSHRs; LQ stalls (%) 220, which indicate a percentage of stalls associated with the load queues; RS stalls (%) 222, which indicate a percentage of stalls associated with the reservation stations data structures; a number of requests issued by the hardware prefetcher in the millions (HWP REQ (M)) 224; and a number of memory access requests in the millions (MEM REQ (M)) 226. The performance results depicted in table 200 can be based on Sage, a simulator which can model the core, cache, network on a chip (NoC), and memory.

The improvement provided by the described aspects (of HA-PRE) can be seen in the certain elements of table 200. The hardware prefetcher (entry 234) can offer a modest performance benefit of 1.16× over the configuration with no hardware prefetching (entry 232) (i.e., 347.6/299.5). As shown in entry 234, the hardware prefetcher issues 9.7M requests in the baseline code with hardware prefetching. However, there are about twice as many memory requests in the original code, and thus at least half of those memory requests (which number could be more if prefetcher requests hit in L3) are not being captured by the hardware prefetcher. These memory requests can be attributed to the irregular references in mcf noted above.

Since the hardware prefetcher is insufficient, the configuration of pre-execution or software prefetching (as discussed above in relation to FIG. 1B) can be used (entry 236). Because the system converts the irregular memory accesses from arc1→tail→potential and arc1→head→potential to non-blocking prefetches, which are timely prefetched, a considerable performance benefit of 1.23× can be seen on top of the benefit from hardware prefetcher (i.e., 299.5/242.7).

However, a considerable amount of load queue stalls still exist after pre-execution/software prefetching (i.e., 62.7%). This may be attributed to the assembly of the pre-execution loop, as depicted above in relation to FIG. 1C. Even though the system can convert the irregular references in Lines 130.5 and 130.6 (of FIG. 1B) to prefetches, and can thus retire them immediately after entering execution, the prefetches themselves and other later operations need to wait for the two load operations coming from Lines 130.4 and 130.6 (of FIG. 1B) to enter execution. These two load operations are shown as corresponding assembly language instructions in bold in FIG. 1C (e.g., line 150.2 in FIG. 1C corresponding to line 130.4 and line 150.6 in FIG. 1C corresponding to line 130.6 (and 130.7)). As can be seen in FIG. 1C, the loop is now dominated by memory operations, a few of which are delinquent, which can result in stalling the instruction issue is stalled due to the filled up load queue (e.g., 62.7% LQ stalls).

The described aspects (i.e., HA-PRE) can change this scenario and can achieve another significant 1.34× speedup over pre-execution (i.e., 242.7/181.3). As depicted in FIG. 1C, at any time, multiple iterations of the pre-execution loop (only ten instructions) are in flight. For some iterations, the loads coming from lines 130.4 and 130.6 complete sooner than others when they are L3 cache hits. Because HA-PRE renders all instructions in the pre-execution loop as non-blocking, loads that finish execution earlier can free their respective load queue entry earlier than prior loads, unlike in traditional OoO execution. Thus, table 200 indicates a reduction in the load queue stalls in entry 238 (e.g., 39.6% compared to 62.7% under pre-execution/software prefetching (entry 236)).

Furthermore, as shown in FIG. 1C, only the operations under Label .L36 ("first set") are dependent on the delinquent loads, while the ones under Label .L35 ("second set") are not dependent on delinquent loads. Since the operations in the first set can finish execution quickly and free their respective ROB entries before the operations in the second set (unlike traditional OoO execution), the operations in the first set can avail more ROB entries to allow for more memory-level parallelism (MLP). The MLP, which can be measured in terms of memory bandwidth) can be enhanced by the same factor over pre-execution as the performance improvement. This may also be evident from the increase in MSHR stalls, e.g., 14.4% MSHR stalls under the HA-PRE configuration (entry 238) as compared to 2.9% MSHR stalls under pre-execution/software prefetching (entry 236).

Detailed Description of Hardware-Assisted Pre-Execution

The described aspects of HA-PRE can include two parts: creation of the pre-execution loop by the user/compiler; and the optimization in hardware of such a loop based on its special properties. The user can create the pre-execution loop upon identifying a loop of interest, e.g., by marking pre-execution regions in the loop. A compiler can also provide certain benefits, such as capturing all memory references due to seeing the loop after function calls have been in-lined and ensuring that no live-in variables used by the main loop are modified by the pre-execution loop. The described aspects can also support non-loops, e.g., by the user marking pre-execution regions in non-loops which can be similarly optimized by the hardware.

Creating the Pre-Execution Loop

The purpose of the pre-execution loop is to warm up the cache for a loop whose performance is bound by memory (latency and/or bandwidth). In such cases, the improvements which can be achieved by HA-PRE may be significant. For other loops whose performance is not bound by memory, the overhead of the pre-execution loop (even though significantly reduced in our approach) can usually be significant enough such that performance with the pre-execution loop may be worse than without the pre-execution loop.

The user can supply a directive on the loop or interest or through a compiler option to insert the pre-execution loop. The user can optionally configure a strip length, or the compiler can calculate the strip length based on various factors. The user can also optionally provide directives on the exact references to prefetch within the loop body. Additionally, the compiler can prefetch to the L2 cache by default.

HA-PRE: Speculative Execution in Traditional Context

In order to speculatively execute an instruction and still maintain program behavior (i.e., to avoid imprecise exceptions), an instruction can proceed through the following four stages.

Issue: In this stage, the system can allocate, to an already decoded instruction, a reservation station (or an entry in load/store queue) and an entry in the ROB. If either the reservation stations or the ROB is full, the current and proceeding instructions become stalled at this stage. If an operand of the issuing instruction is ready, the system can receive that operand from the register file or the ROB.

Execute: Once all operands of an instruction are ready, the instruction can begin execution as soon as an execution port is available.

Write Result: Once an instruction finishes execution, the system can write the result on the Common Data Bus (CDB), and from the CDB into the awaiting ROB entries and reservation stations. At this point, the system can free the reservation station holding the finished instruction. However, the system does not yet free up the load queue entry because in aggressively OoO cores, the loads are allowed to bypass (unresolved) stores and thus must wait until the commit stage.

Commit/Retire: In this stage, the system finally updates the architectural state (e.g., register file or memory) and the instruction can free the ROB entry.

The ROB is an oft-used structure in speculative execution. The ROB allows for instructions to enter execution out-of-order but to commit in-order, and thus can ensure correct program behavior. To achieve this, the ROB can hold the results of completed instructions until they are finally committed. During this "hold" time, the ROB can supply the operands to dependent instructions.

HA-PRE: Demarking Pre-Execution Regions for the Hardware

In traditional speculative execution, each ROB entry can contain five fields: the instruction type (e.g., whether an arithmetic logic unit (ALU), branch, or load/store instruction); the destination field (e.g., the register to which the instruction writes data); the value field (e.g., the result itself); the ready field (e.g., whether the ROB is free or not); and the instruction state (e.g., whether the instruction is in an Issue, Execute, Write Result, or Commit stage).

The described aspects can augment each ROB entry with an additional field: a prefetch region identifier (PRID) field. The PRID field can be used to distinguish instructions within pre-execution regions from normal instructions, which can result in providing certain characteristics and operational behavior for the instructions within the pre-execution regions. The PRID field can also be used to distinguish one pre-execution region from another pre-execution region. If an instruction belongs to a pre-execution region, then the PRID of the corresponding ROB entry will be non-zero; otherwise, the PRID is always zero. The PRID field can be an 8-bit wide field, given the assumption of no more than 255 active prefetch regions at the same time.

FIG. 3 illustrates a reorder buffer (ROB) data structure 300, in accordance with an aspect of the present application. ROB 300 can include rows or entries (such as 330-338) which correspond to instructions and which include at least the following columns: an instruction type 312, which indicates a type of instruction for a respective entry; a destination field 314, which can include, e.g., a register to which a value or result of a respective instruction is to be written; a value field 316, which can indicate the value or result of the respective instruction; a ready field 318, which indicates whether the respective entry is available to be allocated (e.g., free or not free); an instruction state 320, which indicates a current state of the respective instruction, including an issue stage, an execute stage, a write result stage, and a commit stage; and a prefetch region identifier (PRID) 322, which distinguishes instructions within the pre-execution code region from standard instructions and further distinguishes instructions within a first pre-execution code region from a second pre-execution code region.

For example, row 330 can include: an instruction type of "<ALU>"; a destination field of "<REG_A>"; a value of "<VALUE_A>"; a ready field of "<FREE>"; a current instruction state of "<COMMIT>"; and a prefetch region ID of "0," denoted as "<PRID_330.1=0>". Similarly, row 332 can include: an instruction type of "<BRANCH>"; a destination field of "<REG_B>"; a value of "<VALUE_B>"; a ready field of "<NOT FREE>"; a current instruction state of "<ISSUE>"; and a prefetch region ID of "0," denoted as "<PRID_332.1=0>". Rows 334, 336, and 338 can include similar information, and can each correspond to instructions within a same pre-execution loop (as indicated by the same non-zero value of PRID for each of rows 334, 336, and 336 (i.e., denoted respectively as: "<PRID_334.1=1>"; "<PRID_336.1=1>"; and "PRID_338.1=1>"). The destination field of these three rows can be depicted as "n/a," which can indicate that no architectural state is to be updated (i.e., no register is to be written to) as part of this instruction. Furthermore, the instruction state of each of these three rows can be "<COMMIT>" (for row 334) and "<ISSUE>" (for rows 336 and 338).

The system can communicate the start and stop of the pre-execution region to the hardware by using two special instructions: 'start'; and 'stop' (e.g., two unused encodings in the instruction set architecture (ISA)). When the system detects or encounters a 'start' instruction in hardware, the system can increment a hardware counter. When the system detects or encounters a 'stop' instruction, the system can reset the hardware counter to a value of zero.

Upon instruction issue, the system can populate this hardware counter to the ROB entry to denote the PRID of the instruction. Specifically, for a pre-execution loop, the first instruction of loop is a 'start' instruction, and the first instruction following the exit from the loop is a 'stop' instruction. Thus, instructions within a respective iteration of a loop can comprise a same pre-execution region (which can be a different pre-execution region than instructions within a different iteration of the loop). In this manner, the system can use the property of incrementing/resetting the hardware counter (and correspondingly, the PRID) to effectively implement non-blocking loads in HA-PRE.

HA-PRE: Behavior in Pre-Execution Region Versus Normal Behavior

By marking the PRID field in the ROB entry, the system can use the instructions in the pre-execution region to alter the normal behavior of instructions, most notably in the Issue and Commit stages of an instruction execution.

In traditional architectures, before an instruction can commit, that instruction needs to have reached the head of the ROB and needs to be in the write result stage, i.e., the result of the instruction must be ready to commit to a register or memory. This is the property of normal execution which can render a load a blocking operation, i.e., no instructions preceding the delinquent load can commit even though those instruction may be ready to be in the write result stage, since all instructions must commit in-order.

In the described aspects, if a load that belongs to a pre-execution region (i.e., the PRID is a non-zero value) reaches the head of the ROB, the system can "pseudo-commit" the load. That is, the head of the ROB can be allowed to advance to a next entry to consider subsequent instructions for commit, but the system does not update any architectural state for the pseudo-committed instruction, and the system does not free the ROB entry. This pseudo-commit, which can be achieved via incrementing the hardware counter and determining that the PRID is non-zero, can render the load as an effectively non-blocking load. A method which facilitates hardware-assisted pre-execution, using the PRID, is described below in relation to FIGS. 4A-4C.

When the system pseudo-commits a given load, there may exist instructions that still need to use the value of the load, including: instructions that have already issued; and instructions which have not yet issued. The instructions which have already issued can be marked to use the value of the ROB entry of the load once the value is ready. However, the instructions which have not yet issued need to issue in order to obtain the value from the ROB entry. This is due to the pseudo-commit property of not updating the architectural state. That is, the system does not update any register state, which leaves the ROB as the sole source of operand propagation. Thus, the system needs to ensure that all dependent instructions have issued before freeing the ROB entry carrying the load, in addition to ensuring that the load finishes execution and propagates the results. During this time, if the given load instruction reaches the head of ROB, the system will again pseudo-commit the load in order to maintain the non-blocking behavior.

As discussed above, the system needs to ensure that all dependent instructions have issued and received their operand from another instruction waiting to free up its ROB entry. At this point, the PRID is used. Because the system does not store to memory in the pre-execution region, dependences can only span consecutive loop iterations or pre-execution regions (e.g., a current pre-execution region and a next pre-execution region). As a result, the system can ensure that all dependent instructions are issued if the hardware counter tracking the global PRID (which counter is incremented at the beginning of each loop iteration) is ahead of the PRID of the given load by more than 1. If this condition holds, and as long as the given load has entered the write result stage, the system can free the ROB entry. If this condition does not hold, the system can advance the ROB head pointer to a next entry in the ROB, thus refraining from freeing the ROB entry and instead skipping over the ROB entry, as described below in relation to FIGS. 4A-4C. The system can perform this check in the issue stage. If the system determines that an ROB entry is free, the system can allocate that ROB entry to a new instruction. The system can issue any instructions outside of the pre-execution normally.

If the tail of the ROB meets an in-progress pseudo-committed instruction entry, the system can skip that entry and consider the next entry for issue. In a single cycle, the system can skip only a few instructions (also known as the "issue width"). The system can stop the issue of an instruction when the tail of the ROB meets the head of the ROB, which does not affect the circular queue implementation of the ROB.

Mis-Speculation, Other Operations, and Avoiding Deadlock

Mis-speculation may occur in three different ways in and around a pre-execution region/loop. First, a mis-speculation at the pre-execution loop boundary can cause extra iterations to execute. This can be benign because instructions in the pre-execution loop do not change state. Thus, the system can resume correct instruction execution without flushing the ROB. Second, a mis-speculation at the pre-execution loop boundary can cause a pre-mature loop termination. In this case, the system can execute the 'stop' instruction, which can reset the PRID counter and thereby cause an anomaly in instruction PRIDs when the system resumes correct execution. However, the system can avoid this because the 'stop' instruction is not within the pre-execution loop and thus is itself not pseudo-committed. The 'stop' instruction can only change the PRID counter upon an actual commit, which does not happen upon a mis-speculation. Third, a mis-speculation can occur within the pre-execution region/loop (such as at a conditional statement). In this case, the system flushes the ROB, but only in cases when the trip count of the pre-execution loop is not dependent on the outcome of a conditional statement within the loop. This can be determined by the compiler. For cases in which the trip count of the pre-execution loop is dependent on the outcome of a conditional statement within the loop, the system may need to flush the ROB and restore the PRID and the architectural state in order to resume execution in a way that does not cause improper or unexpected behavior.

The described aspects involve using a load in the pre-execution region as an example, but all other operations (e.g., address generation operations and branches) may be given the same treatment. These operations need to free their ROB entry sooner than all earlier instructions have freed their ROB entry, because the system can then allocate these freed ROB entries to new instructions, which can result in an increased MLP as well as improved performance. The described aspects can further provide performance improvement based on the early freeing of load queue entries by loads in the pre-execution region. Rather than waiting for commit, the system can free those entries upon instruction completion. Furthermore, for these loads in the pre-execution region, the system does not need to participate in the expensive fully associative lookup of the load queue by each committing store to detect address conflicts. This can result in an energy savings, which can further improve the performance of the system.

To avoid deadlock, the system must determine that a certain condition or threshold is met. Because no instruction within an iteration n can free its ROB entry until all instructions in iteration n as well as all instructions in iteration n+1 (i.e., the next iteration or the next pre-execution region) have issued, there can be no more instructions within a single iteration of the pre-execution loop than half the number of ROB entries, as the number of instructions within two iterations need to fit in the ROB.

Methods which Facilitate Hardware-Assisted Pre-Execution

FIG. 4A presents a flowchart 400 illustrating a method which facilitates hardware-assisted pre-execution, in accordance with an aspect of the present application. During operation, the system determines a pre-execution code region comprising one or more instructions (operation 402). The system increments a global counter upon initiating the one or more instructions (operation 404) (e.g., by detecting a start instruction in hardware associated with execution of the one or more instructions). The system issues a first instruction, which involves setting, in a first entry for the first instruction in a data structure (e.g., an ROB), a first prefetch region identifier with a current value of the global counter (operation 406). If the ROB head pointer does not reach the first entry (decision 408), the operation returns. If the ROB head pointer reaches the first entry, the system determines, based on the first prefetch region identifier, whether the first entry is available to be allocated (operation 410) and the operation continues at Label A of FIG. 4B. If the ROB head pointer reaches the first entry, the operation also continues at Label B of FIG. 4C.

Figure 4B:
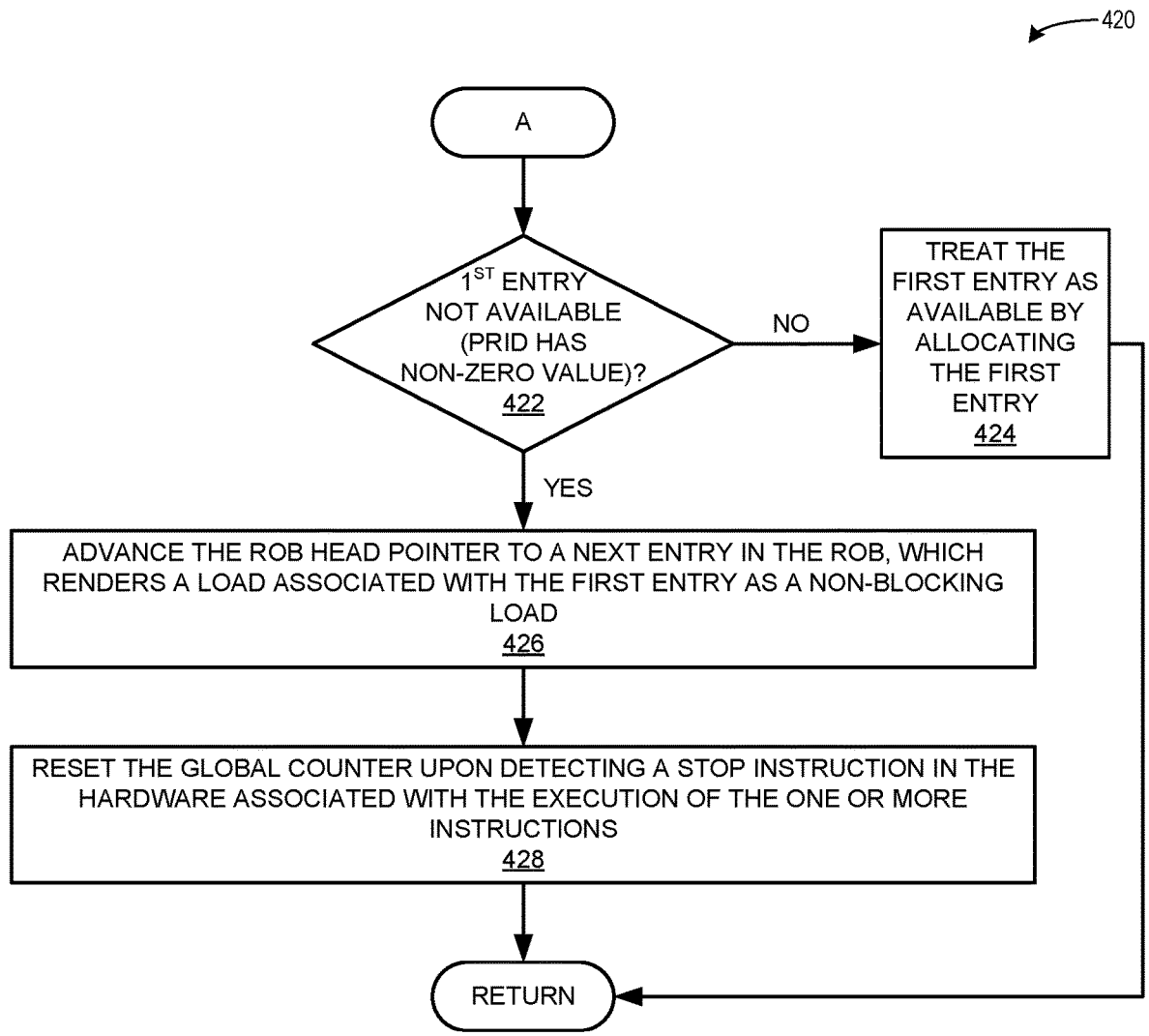
FIG. 4B presents a flowchart illustrating a method which facilitates hardware-assisted pre-execution, in accordance with an aspect of the present application.

FIG. 4B presents a flowchart 420 illustrating a method which facilitates hardware-assisted pre-execution, in accordance with an aspect of the present application. If the first entry is available (i.e., the PRID has a zero value) (decision 422), the system treats the first entry as available by allocating the first entry (operation 424), and the operation returns. If the first entry is not available (i.e., the PRID has a non-zero value) (decision 422), the system advances the head pointer to a next entry in the data structure (ROB) (e.g., by skipping the first entry), which renders a load associated with the first entry as a non-blocking load (operation 426). The system resets the global counter upon completing the one or more instructions (operation 428) (e.g., by detecting a stop instruction in the hardware associated with the one or more instructions).

Figure 4C:
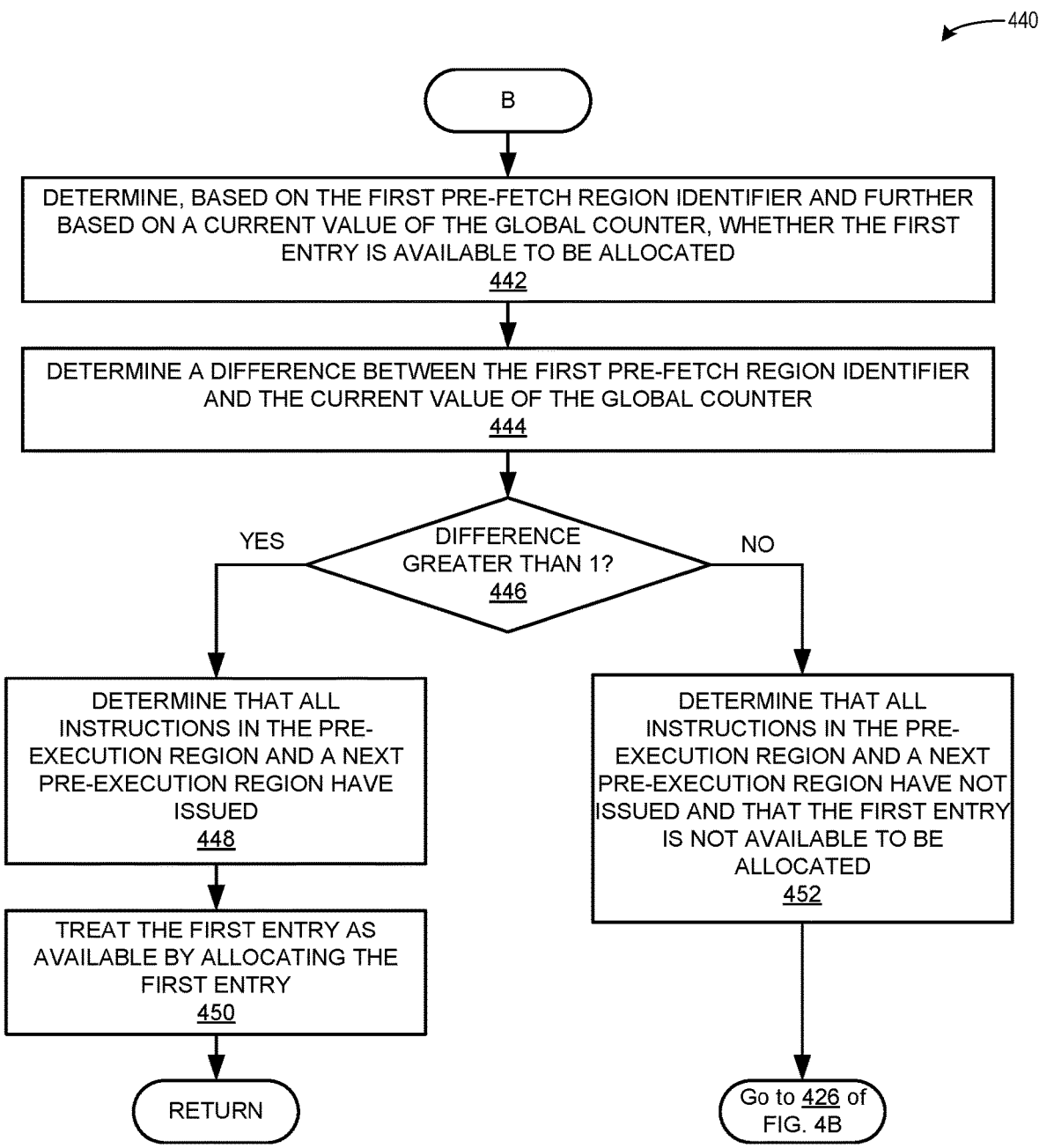
FIG. 4C presents a flowchart illustrating a method which facilitates hardware-assisted pre-execution, including determining a difference between a prefetch region identifier and a current value of a global counter, in accordance with an aspect of the present application.

FIG. 4C presents a flowchart 440 illustrating a method which facilitates hardware-assisted pre-execution, including determining a difference between a prefetch region identifier and a current value of a global counter, in accordance with an aspect of the present application. The system determines, based on the first prefetch region identifier and further based on a current value of the global counter, whether the first entry is available to be allocated (operation 442). The system determines a difference between the first prefetch region identifier and the current value of the global counter. Responsive to determining that the difference is greater than 1 (decision 446), the system determines that all instructions in the pre-execution region and a next pre-execution region have issued (operation 448) and treats the first entry as available by allocating the first entry (operation 450). The operation returns.

Responsive to determining that the difference is not greater than 1 (decision 446), the system determines that all instructions in the pre-execution region and the next pre-execution region have not issued and that the first entry is not available to be allocated (operation 452), and the operation continues at operation 426 of FIG. 4B (i.e., advancing the ROB head pointer by skipping the first entry).

Computer System and Apparatus

Figure 5:
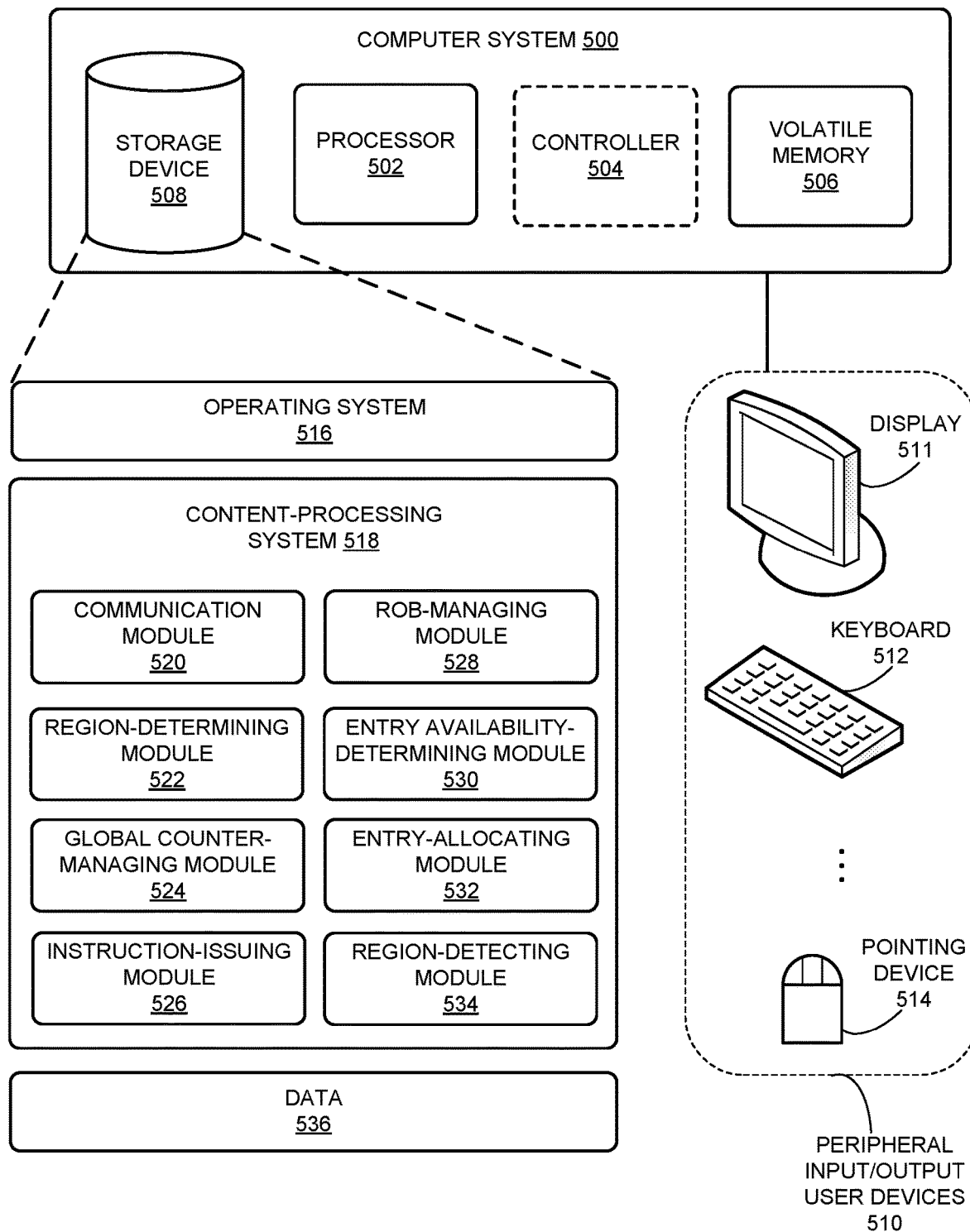
FIG. 5 illustrates a computer system which facilitates hardware-assisted pre-execution, in accordance with an aspect of the present application.

FIG. 5 illustrates a computer system which facilitates hardware-assisted pre-execution, in accordance with an aspect of the present application. Computer system 500 includes a processor 502, a volatile memory 506, and a storage device 508. In some aspects, computer system 500 can include a controller 504 (indicated by the dashed lines). Volatile memory 506 can include, e.g., random access memory (RAM), that serves as a managed memory, and can be used to store one or more memory pools. Storage device 508 can include persistent storage which can be managed or accessed via processor 502 (or controller 504). Furthermore, computer system 500 can be coupled to peripheral input/output (I/O) user devices 510, e.g., a display device 511, a keyboard 512, and a pointing device 514. Storage device 508 can store an operating system 516, a content-processing system 518, and data 536.

Content-processing system 518 can include instructions, which when executed by computer system 500, can cause computer system 500 or processor 502 to perform methods and/or processes described in this disclosure. Specifically, content-processing system 518 can include instructions for receiving and transmitting data packets or instructions (communication module 520).

Content-processing system 518 can further include instructions for determining a pre-execution code region comprising one or more instructions (region-determining module 522). Content-processing system 518 can include instructions for incrementing a global counter upon initiating the one or more instructions (global counter-managing module 524). Content-processing system 518 can include instructions for issuing a first instruction, which involves setting, in a first entry for the first instruction in a data structure, a first prefetch region identifier with a current value of the global counter (instruction-issuing module 526). Content-processing system 518 can also include instructions for, responsive to a head pointer of the data structure reaching the first entry (ROB-managing module 528): determining, based on a non-zero value for the first prefetch region identifier, that the first entry is not available to be allocated (entry availability-determining module 530); and advancing the head pointer to a next entry in the data structure, which renders a load associated with the first entry as a non-blocking load (ROB-managing module 528). Content-processing system 518 can include instructions for resetting the global counter upon completing the one or more instructions (global counter-managing module 524).

Content-processing system 518 can also include instructions for determining a difference between the first prefetch region identifier and the current value of the global counter (entry availability-determining module 530). Content-processing system 518 can include instructions for, responsive to determining that the difference is greater than 1 (entry availability-determining module 530): determining that all instructions in the pre-execution region and a next pre-execution region have issued (entry availability-determining module 530); and treating the first entry as available by allocating the first entry (entry-allocating module 532). Content-processing system 518 can further include instructions for, responsive to determining that the difference is not greater than 1 (entry availability-determining module 530), determining that all instructions in the pre-execution region and the next pre-execution region have not issued and that the first entry is not available to be allocated (entry availability-determining module 530).

Content-processing system 518 can additionally include instructions for incrementing the global counter upon initiating the one or more instructions by detecting a start instruction in hardware associated with execution of the one or more instructions (region-detecting module 534) and for resetting the global counter to the value of zero upon completing the one or more instructions by detecting a stop instruction in the hardware associated with the execution of the one or more instructions (region-detecting module 534).

Data 536 can include any data that is required as input or generated as output by the methods and/or processes described in this disclosure. Specifically, data 536 can store at least: an instruction; a pre-execution code region; a loop or iteration; a counter; a global counter; an entry; a data structure; a reorder buffer (ROB) data structure; a queue; a load/store queue; reservation stations; a circular queue; an instruction type; a destination field; a value or a result; a ready field; an instruction state; a prefetch region identifier; an entry; data; an indicator of a cache or memory; a difference; a difference between a prefetch region identifier and a current value of a global counter; a start instruction; a stop instruction; and an indicator of detecting a condition, start instruction, a stop instruction, or a code region.

Figure 6:
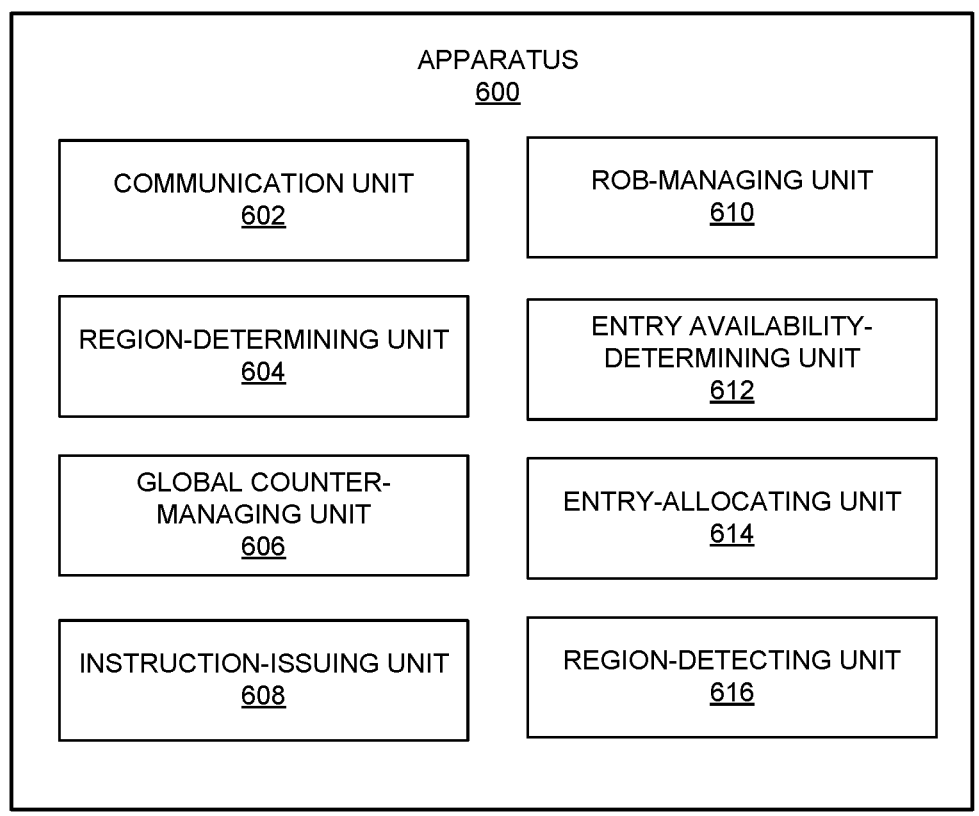
FIG. 6 illustrates an apparatus which facilitates hardware-assisted pre-execution, in accordance with an aspect of the present application.

FIG. 6 illustrates an apparatus which facilitates hardware-assisted pre-execution, in accordance with an aspect of the present application. Apparatus 600 can comprise a plurality of units or apparatuses which may communicate with one another via a wired, wireless, quantum light, or electrical communication channel. Apparatus 600 may be realized using one or more integrated circuits, and may include fewer or more units or apparatuses than those shown in FIG. 6. Furthermore, apparatus 600 may be integrated in a computer system, or realized as a separate device or devices capable of communicating with other computer systems and/or devices.

Apparatus 600 may also include a non-volatile storage system or a memory management unit. Apparatus 600 can comprise modules or units 602-616 which are configured to perform functions or operations similar to modules 520-534 of computer system 500 of FIG. 5, including: a communication unit 602; a region-determining unit 604; a global counter-managing unit 606; an instruction-issuing unit 608; an ROB-managing unit 610; an entry availability-determining unit 612; an entry-allocating unit 614; and a region-detecting unit 616.

In general, the disclosed aspects provide a system which facilitates hardware-assisted pre-execution. In one aspect, during operation, the system determines a pre-execution code region comprising one or more instructions. The system increments a global counter upon initiating the one or more instructions. The system issues a first instruction, which involves setting, in a first entry for the first instruction in a data structure, a first prefetch region identifier with a current value of the global counter. Responsive to a head pointer of the data structure reaching the first entry, the system: determines, based on a non-zero value for the first prefetch region identifier, that the first entry is not available to be allocated; and advances the head pointer to a next entry in the data structure, which renders a load associated with the first entry as a non-blocking load. The system resets the global counter upon completing the one or more instructions.

In a variation on this aspect, the one or more instructions in the pre-execution code region comprise prefetch operations which place data in a cache.

In a further variation, the data retrieved by the prefetch operations in the pre-execution code region can be used only by operations in the pre-execution code region or in a next pre-execution code region.

In a further variation, the system determines that the first entry is not available to be allocated based on the first prefetch region identifier and further based on a current value of the global counter. The system determines a difference between the first prefetch region identifier and the current value of the global counter. Responsive to determining that the difference is greater than 1, the system determines that all instructions in the pre-execution region and a next pre-execution region have issued; and treats the first entry as available by allocating the first entry. Responsive to determining that the difference is not greater than 1, the system determines that all instructions in the pre-execution region and the next pre-execution region have not issued and that the first entry is not available to be allocated.

In a further variation, the pre-execution code region corresponds to a loop or iteration.

In a further variation, the data structure comprises a circular queue.

In a further variation, the data structure comprises a reorder buffer. The entries in the reorder buffer correspond to instructions and include: a type of instruction for a respective entry; a destination field, including a register to which a value or result of a respective instruction is to be written; the value or result of the respective instruction; a ready field which indicates whether the respective entry is available to be allocated; a state of the respective instruction, including an issue stage, an execute stage, a write result stage, and a commit stage; and a prefetch region identifier which distinguishes instructions within the pre-execution code region from standard instructions and further distinguishes instructions within a first pre-execution code region from a second pre-execution code region.

In a further variation, incrementing the global counter upon initiating the one or more instructions comprises detecting a start instruction in hardware associated with execution of the one or more instructions. Resetting the global counter to the value of zero upon completing the one or more instructions comprises detecting a stop instruction in the hardware associated with the execution of the one or more instructions.

In a further variation, incrementing the global counter and resetting the global counter further comprise detecting user-configured pre-execution code in regions which are not marked as pre-execution code regions or which do not comprise loops or iterations.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware devices or apparatus. For example, the hardware devices or apparatus can include, but are not limited to, application-specific integrated circuit (ASIC) chips, field-programmable gate arrays (FPGAs), dedicated or shared processors that execute a particular software program or a piece of code at a particular time, and other programmable-logic devices now known or later developed. When the hardware devices or apparatus are activated, the hardware modules perform the methods and processes included within them.

The foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A computer system, comprising:
one or more processors; and
a memory coupled to the one or more processors and storing instructions which, when executed by the one or more processors, cause the processors to:
set, in a first entry for a first instruction in a data structure, a first prefetch region identifier with a first current value of a global counter; and
responsive to a head pointer of the data structure reaching the first entry:
determine, based on a non-zero value for the first prefetch region identifier, that the first entry is not available to be allocated; and
advance the head pointer to a next entry in the data structure, which renders a load associated with the first entry as a non-blocking load.

2. The computer system of claim 1, wherein the first instruction is included in a pre-execution code region comprising one or more instructions.

3. The computer system of claim 2, wherein execution of the instructions further causes the one or more processors to increment the global counter upon initiating the one or more instructions and before setting the first prefetch region identifier.

4. The computer system of claim 3, wherein execution of the instructions further causes the one or more processors to reset the global counter upon completion of the one or more instructions.

5. The computer system of claim 4, wherein:
the increment of the global counter upon initiating the one or more instructions is in response to detecting a start instruction in hardware associated with execution of the one or more instructions, and
the reset of the global counter upon completing the one or more instructions is in response to detecting a stop instruction in the hardware associated with an execution of the one or more instructions.

6. The computer system of claim 2, wherein the one or more instructions in the pre-execution code region comprise prefetch operations which place data in a cache.

7. The computer system of claim 2, wherein:
the determination that the first entry is not available to be allocated is based on the first prefetch region identifier and further based on a second current value of the global counter, and
execution of the instructions by the one or more processors further causes the one or more processors to:
determine a difference between the first prefetch region identifier and the second current value of the global counter; and
responsive to determining that the difference is not greater than 1, determine that all instructions in the pre-execution code region and a next pre-execution code region have not issued and that the first entry is not available to be allocated.

8. The computer system of claim 2, wherein the pre-execution code region corresponds to a loop or iteration.

9. The computer system of claim 2, wherein:
the data structure comprises a reorder buffer, and
entries in the reorder buffer correspond to instructions and the entries include:
a type of instruction for a respective entry;
a destination field, including a register to which a value or result of a respective instruction is to be written;
the value or result of the respective instruction;
a ready field which indicates whether the respective entry is available to be allocated;
a state of the respective instruction, including an issue stage, an execute stage, a write result stage, and a commit stage; and
a prefetch region identifier filed which distinguishes instructions within the pre-execution code region from standard instructions and further distinguishes instructions within a first pre-execution code region from a second pre-execution code region.

10. A computer-implemented method, comprising:
setting, in a first entry for a first instruction in a data structure, a first prefetch region identifier with a first current value of a global counter; and
responsive to a head pointer of the data structure reaching the first entry:
determining, based on a non-zero value for the first prefetch region identifier, that the first entry is not available to be allocated; and
advancing the head pointer to a next entry in the data structure, which renders a load associated with the first entry as a non-blocking load.

11. The computer-implemented method of claim 10, wherein the first instruction is included in a pre-execution code region comprising one or more instructions.

12. The computer-implemented method of claim 11, further comprising incrementing the global counter upon initiating the one or more instructions and before setting the first prefetch region identifier.

13. The computer-implemented method of claim 12, further comprising resetting the global counter upon completion of the one or more instructions.

14. The computer-implemented method of claim 13, wherein:
incrementing the global counter upon initiating the one or more instructions is performed in response to detecting a start instruction in hardware associated with execution of the one or more instructions, and
resetting the global counter upon completing the one or more instructions is performed in response to detecting a stop instruction in the hardware associated with an execution of the one or more instructions.

15. The computer-implemented method of claim 11, wherein the one or more instructions in the pre-execution code region comprise prefetch operations which place data in a cache.

16. The computer-implemented method of claim 11, wherein determining that the first entry is not available to be allocated is based on the first prefetch region identifier and further based on a second current value of the global counter, and wherein the method further comprises:
- determining a difference between the first prefetch region identifier and the second current value of the global counter; and
- responsive to determining that the difference is not greater than 1, determining that all instructions in the pre-execution code region and a next pre-execution code region have not issued and that the first entry is not available to be allocated.

17. The computer-implemented method of claim 11, wherein the pre-execution code region corresponds to a loop or iteration.

18. A non-transitory computer-readable storage medium storing instructions that, when executed by a computer, cause the computer to:
- set, in a first entry for a first instruction in a data structure, a first prefetch region identifier with a first current value of a global counter; and
- responsive to a head pointer of the data structure reaching the first entry:
  - determine, based on a non-zero value for the first prefetch region identifier, that the first entry is not available to be allocated; and
  - advance the head pointer to a next entry in the data structure, which renders a load associated with the first entry as a non-blocking load.

19. The non-transitory computer readable storage medium of claim 18, wherein the first instruction is included in a pre-execution code region comprising one or more instructions.

20. The non-transitory computer readable storage medium of claim 19, wherein the execution of the instructions further causes the computer to:
- increment the global counter upon initiating the one or more instructions and before setting the first prefetch region identifier; and
- reset the global counter upon completion of the one or more instructions.

* * * * *